(12) United States Patent
Van Dyke et al.

(10) Patent No.: US 7,602,422 B2
(45) Date of Patent: Oct. 13, 2009

(54) SERIAL CAMERA INTERFACE

(75) Inventors: Phil Van Dyke, Surrey (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 731 days.

(21) Appl. No.: 11/177,819

(22) Filed: Jul. 8, 2005

(65) Prior Publication Data

US 2007/0008414 A1    Jan. 11, 2007

(51) Int. Cl.
H04N 5/228    (2006.01)

(52) U.S. Cl. .............................. 348/222.1; 348/207.99

(58) Field of Classification Search .............. 348/207.1, 348/222.1, 231.99, 221.1, 73, 159, 143
See application file for complete search history.

(56) References Cited

U.S. PATENT DOCUMENTS

| | | | | |
|---|---|---|---|---|
| 5,550,586 A | * | 8/1996 | Kudo et al. | ............... 348/222.1 |
| 5,568,192 A | | 10/1996 | Hannah | |
| 6,025,874 A | * | 2/2000 | Cooper et al. | ............... 348/159 |
| 6,285,398 B1 | | 9/2001 | Shinsky et al. | |
| 6,449,007 B1 | * | 9/2002 | Yokoyama | ................... 348/73 |
| 6,498,621 B1 | * | 12/2002 | Ikeda et al. | ............... 348/222.1 |
| 6,697,112 B2 | | 2/2004 | Morris et al. | |
| 6,833,863 B1 | | 12/2004 | Clemens | |
| 2001/0001563 A1 | | 5/2001 | Tomaszewski | |
| 2003/0058346 A1 | | 3/2003 | Bechtel et al. | |
| 2003/0158978 A1 | | 8/2003 | Ishibashi | |
| 2004/0085446 A1 | * | 5/2004 | Park | ........................... 348/143 |
| 2004/0119844 A1 | * | 6/2004 | Aldrich et al. | ......... 348/231.99 |
| 2004/0155966 A1 | | 8/2004 | Jang et al. | |
| 2006/0274152 A1 | * | 12/2006 | Low et al. | ................. 348/207.1 |

FOREIGN PATENT DOCUMENTS

| | | | |
|---|---|---|---|
| JP | 2001-128111 A | 5/2001 | |
| JP | 2001-275066 A | 10/2001 | |

* cited by examiner

*Primary Examiner*—Tuan V Ho
*Assistant Examiner*—Selam T Gebriel

(57) ABSTRACT

An interface for a graphics controller enabling communication with a camera module is provided. The interface includes a first port configured to receive serial image data from a camera module and a second port configured to receive a clock signal, wherein the clock signal is utilized to indicate both a horizontal synchronization and a vertical synchronization for frames of image data received from the camera module. An image capture device having the serial interface and methods for reducing a number of signals utilized for an interface receiving image data are also included.

9 Claims, 4 Drawing Sheets

SERIAL CAMERA INTERFACE

BACKGROUND

In a typical camera module that is intended for the mobile communications market, image data is sent by the camera module to a graphics processor or a host central processing unit (CPU) over a camera bus interface. This camera interface typically consists of data signals, synchronization control signals, and a clock signal. Image data is sent by the camera typically on 8, 10, 12, or 16 data lines and this data is interpreted by two synchronization control signals that define the start of the frame of the image data and the start of a line of the image data. A data clock is used to define when the data lines are valid, i.e., a pixel of image data. Therefore, at a minimum, there are eleven signals, eight data and three control signals, that are needed on the camera interface to define the camera image data to the graphics processor or host CPU. If data is sent in parallel, then a total of eleven signal lines may be needed to transmit the data and control signals. When chip real estate is limited or when signal lines need to be routed through a hinge, such as in a cellular phone with a rotating camera platform, reducing the amount of signals needed to communicate to each device in a system is very desirable.

In view of the foregoing, there is a need to provide an apparatus and a method for communicating data and control signals enabling a more robust mechanical design in systems where the signals must be routed through mechanical devices, such as hinges.

SUMMARY

Broadly speaking, the present invention fills these needs by providing a system in which the data and control signals are reduced in order to reduce the amount of signal lines required to carry these signals. It should be appreciated that the present invention can be implemented in numerous ways, including as a method, a system, or a device. Several inventive embodiments of the present invention are described below.

In accordance with one embodiment of the invention, an image capture device is provided. The image capture device includes a camera module configured to capture image data and a graphics controller. The graphics controller includes counter/comparator logic for recognizing an end of a horizontal line of the image data and clock pause recognition logic configured to detect an interruption in a clock signal indicative of an end of a frame of the image data. First and second signal lines connecting the camera module and the graphics controller are included. The first signal line serially transfers the image data from the camera module to the graphics controller and the second signal line communicates a clock signal between the camera module to the graphics controller.

In accordance with another embodiment of the present invention, an interface for a graphics controller enabling communication with a camera module is provided. The interface includes a first port configured to receive serial image data from a camera module and a second port configured to receive a clock signal, wherein the clock signal is utilized to indicate both a horizontal synchronization and a vertical synchronization for frames of image data received from the camera module.

In accordance with yet another embodiment of the present invention, a method for signaling a start and end of frame and line data for a serial interface having a maximum of two signal lines is provided. The method initiates with receiving image data over a first line and receiving a clock signal associated with the data over a second line. While receiving the image data, the method includes counting a number of clock cycles; comparing the number of clock cycles to a value representing a number of pixels defining a horizontal line within the frame data; and continuing the counting and the comparing until the number of clock cycles matches the value. When the number of clock cycles matches the value, the method includes, identifying the end of the line data; resetting a count representing the number of clock cycles; counting the number of clock cycles; and comparing the number of clock cycles to a value representing a non-display period between horizontal lines within the frame data. When the number of clock cycles matches the value representing the non-display period, the method further includes repeating the above method operations for successive line data.

In still yet another embodiment of the invention, a method for reducing a number of signals utilized for an interface receiving image data is provided. The method initiates with receiving image data in a serial format over a first signal line and receiving a clock signal over a second signal line. Then, the clock signal is monitored to identify both transitions between frames of the image data and transitions between horizontal lines within a frame of the image data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for hardware implemented methods and apparatuses for reducing the amount of signals and signal lines between a camera module and a graphics chip. It will be obvious, however, to one skilled in the art, that the present invention may be practiced without some or all of these specific details. In other instances, well known process operations have not been described in detail in order not to unnecessarily obscure the present invention.

The embodiments described herein provide a method and apparatus where the amount of control and data signals transferred between a camera module and a graphics chip/host central processing unit (CPU) is minimized. As a result of minimizing the signals, the amount of signal lines needed may be reduced. In one embodiment, the image data is sent serially from the camera sensor to the graphics chip over one signal line while a clock signal is sent over a second signal line. Logic located within the graphics chip/CPU detects beginning/end of frame and line data by monitoring the clock signal. For example, as described in more detail below, a break in the clock signal may indicate an end of a frame of image data and the resumption of the clock signal after the break may indicate a beginning of a next frame of image data. Thus, the vertical synchronization signal may be eliminated through this scheme. In addition, logic counting the number of clock cycles, in conjunction with comparators used to compare the counted clock cycles to register values, function to replace a horizontal synchronization signal. Thus, the interface of the graphics chip/CPU may be configured to accept two signal lines and eliminate the need for receiving separate vertical and horizontal synchronization signals, as described further in the embodiments discussed below.

Figure 1:
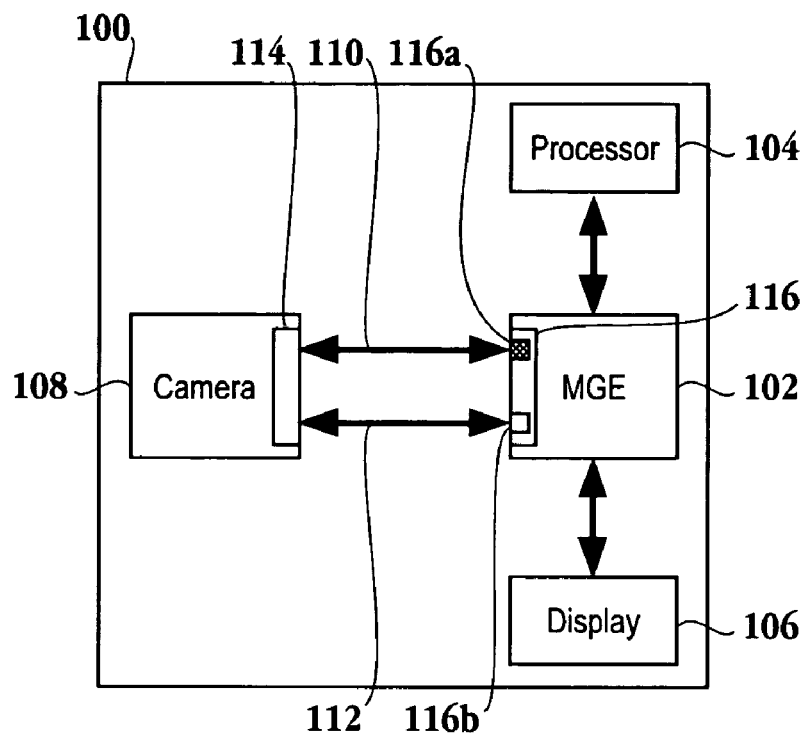
FIG. 1 is a high level simplified schematic diagram of a device having a serial camera interface with a maximum of two signal lines in accordance with one embodiment of the invention.

FIG. 1 is a high level simplified schematic diagram of a device having a serial camera interface with a maximum of two signal lines in accordance with one embodiment of the invention. Device 100 includes display module 106, mobile graphics engine 102, processor 104, and camera module 108. Camera module 108 is in communication with mobile graphics engine 102 through signal lines 110 and 112 and associated interfaces 114 and 116. Interface 116 includes interface ports 116a and 116b for receiving corresponding signals. In one embodiment, device 100 is a portable electronic device, such as a cellular telephone, personal digital assistant, web tablet, pocket personal computer, and any other suitable portable electronic information device. One skilled in the art will appreciate that processor 104 may be a central processing unit (CPU) or a specific processor such as a digital signal processor. Mobile graphics engine (MGE) 102 may also be referred to as a graphics controller. It should be appreciated that camera module 108 may be a charged coupled device or a complimentary metal oxide semiconductor sensor. Camera module 108 outputs image data onto data line 110 as serial data. A data clock, which is communicated over line 112, is used to define when the data on line 110 is valid. It should be noted that the data format of the camera interface is any suitable format and that the data is sent from the camera module serially rather than in parallel. One skilled in the art will appreciate that numerous data formats may be used to send data over the data interface, e.g., YUV422, YUV420, RGB565, Bayer 12-bit, etc. With just the two signal lines being used in device 100, i.e., signal line 110 and signal line 112, the vertical synchronization signal and the horizontal synchronization signals are no longer available. Thus, through the embodiments described below, alternative techniques are disclosed to substitute for the vertical synchronization signal and the horizontal synchronization signal.

Figure 2:
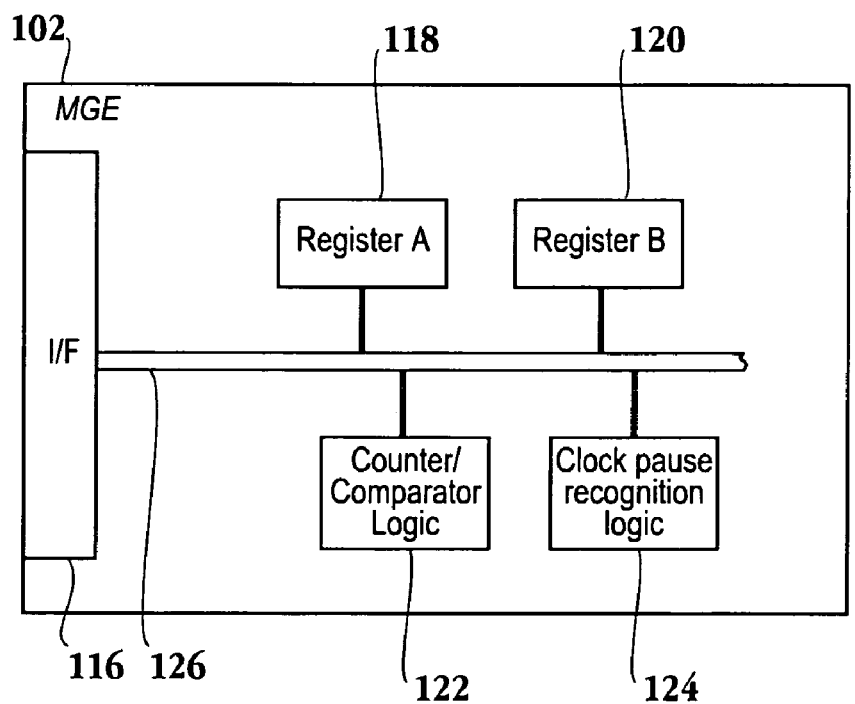
FIG. 2 is a high level schematic diagram illustrating further details on the mobile graphics engine of FIG. 1.

FIG. 2 is a high level schematic diagram illustrating further details on the mobile graphics engine of FIG. 1. Mobile graphics engine 102 includes interface 116, register A 118, register B 120, clock pause recognition logic 124, and counter/comparator logic 122 all in communication with each other over bus 126. It should be appreciated that mobile graphics engine 102 may contain numerous blocks such as memory, etc., however, for illustrative purposes only the blocks mentioned above are depicted. It will be apparent to one skilled in the art that numerous registers may be distributed throughout the mobile graphics engine. As will be described in more detail with reference to FIGS. 3-6, registers 118 and 120 are used to hold values representing a number of clock cycles that occur during a horizontal non-display period and a number of clock cycles that occur during a horizontal display period, respectively. Counter/comparator logic 122 functions to compare values within register A and register B 118 and 120 to a number of clock cycles being receive through interface 116. The logic included with counter/comparator logic 122 includes counters configured to count the clock cycles and comparators for comparing the clock cycle count to the corresponding register value. When the clock cycles received through interface 116 are equal to the corresponding values in register A 118 and register B 120, this indicates that a line may be starting or ending as will be described in more detail below. The logic of clock pause recognition 124 is configured to sample the clock signal and when this clock is sampled low for more than one clock period, the clock signal has been paused and the end of the image has been reached. In one embodiment, this will cause a reset in the camera interface logic so that everything is reset to start at the beginning of the image again. Since the clock is not toggling, the horizontal display and non-display counters will remain at 0. Once the clock signal starts again, these counters will start incrementing again.

Figure 3:
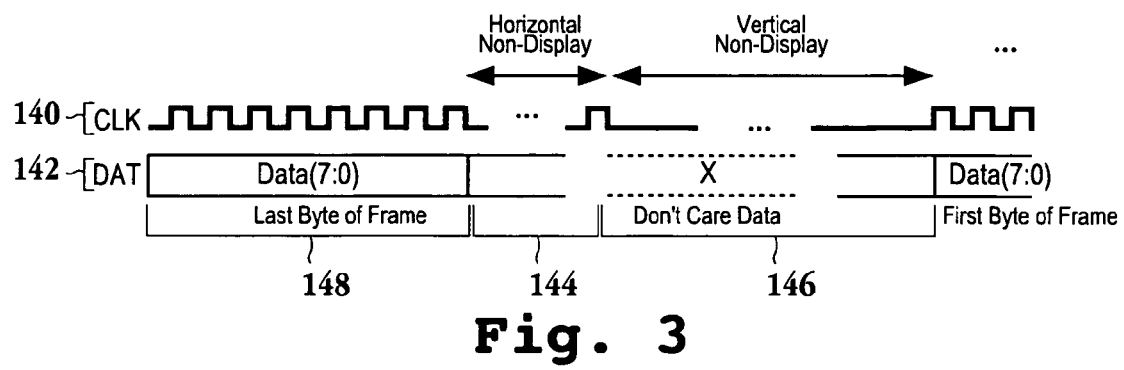
FIG. 3 is a simplified waveform diagram illustrating the use of the clock data to indicate a vertical non-display period in accordance with one embodiment of the invention.

FIG. 3 is a simplified waveform diagram illustrating the use of the clock data to indicate a vertical non-display period in accordance with one embodiment of the invention. Waveform 140 represents a clock signal being received by the mobile graphics engine. Line 142 represents the data being sent over signal line 110 of FIGS. 1 and 2. As illustrated in FIG. 3, clock signal 140 continues to toggle between a high and low state during horizontal display period 148 and horizontal non-display period 144. However, the toggling of clock signal 140 is paused or interrupted during vertical non-display period 146. Therefore, this clock stoppage may be used to signal the end of a current frame in place of a vertical synchronization signal. Thus, the beginning of a new frame is signaled by the data clock re-starting. It should be appreciated that either the rising or the falling edge of the data clock signal may be used to indicate that the data is valid on the data line. One skilled in the art will appreciate that the data on the data line during vertical non-display period 146 is not captured. Additionally, while FIG. 3 illustrates clock signal 140 being driven low during vertical non-display period 146, the clock signal may be driven high in one embodiment. The embodiments described herein will accommodate either scheme as long as the clock signal ceases to toggle and remains at a substantially steady state.

Figure 4:
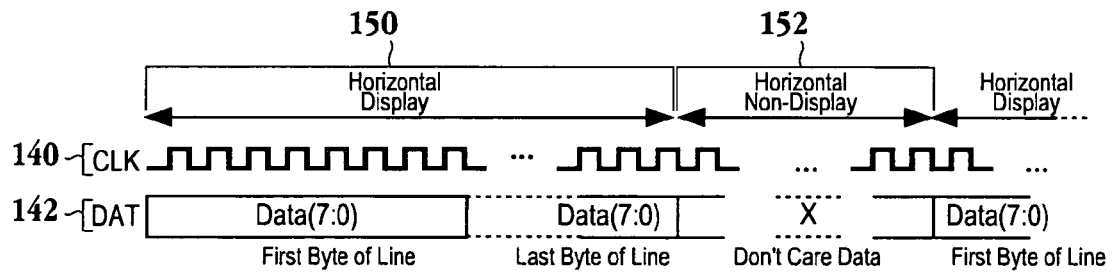
FIG. 4 is a simplified waveform diagram indicating a technique for identifying the end and beginning of horizontal lines in the absence of a horizontal synchronization signal in accordance with one embodiment of the invention.

FIG. 4 is a simplified waveform diagram indicating a technique for identifying the end and beginning of horizontal lines in the absence of a horizontal synchronization signal in accordance with one embodiment of the invention. Clock signal 140 is received by the interface of the mobile graphics engine represented in FIGS. 1 and 2. Data signal 142 is likewise received by the interface of the mobile graphics engine. As mentioned above with reference to FIG. 2, the number of clock cycles associated with the horizontal display period 150 is stored in a register of the mobile graphics engine. In addition, the number of clock cycles associated with horizontal non-display period 152 is also stored within a register of the mobile graphics engine. As these registers define the horizontal display and non-display times of the camera input, a technique for defining the horizontal display and non-display times may be formulated. That is, based on the number of data clock cycles, a new line will then start once the interface has seen the horizontal display and non-display times. As illustrated in FIG. 4, each clock cycle associated with the horizontal display time 148 is counted. This counted number is then compared to a register value and when the counted number equals the register value an end of the horizontal display is indicated. Thereafter, a number of clock cycles is counted again and this count is then compared to a different register value indicating the number of horizontal non-display clock cycles. It should be appreciated that if the same counter is performing the counting of the clock cycles during the display and non-display periods, the counter will re-set after each display period. When the counted number equals the number in the corresponding register holding the horizontal non-display value, the horizontal non-display period has ended and a new line will begin. In an alternative embodiment, the values stored in registers A and B is the actual image resolution size in pixels, rather than clock cycles. It should be appreciated that in this embodiment, the programming becomes simplified and eliminates the need for the user to figure out how many clocks per pixel is needed. The camera interface determines based on these register values and the data format selected for the camera interface, how many clocks it needs to count for each pixel.

Figure 5:
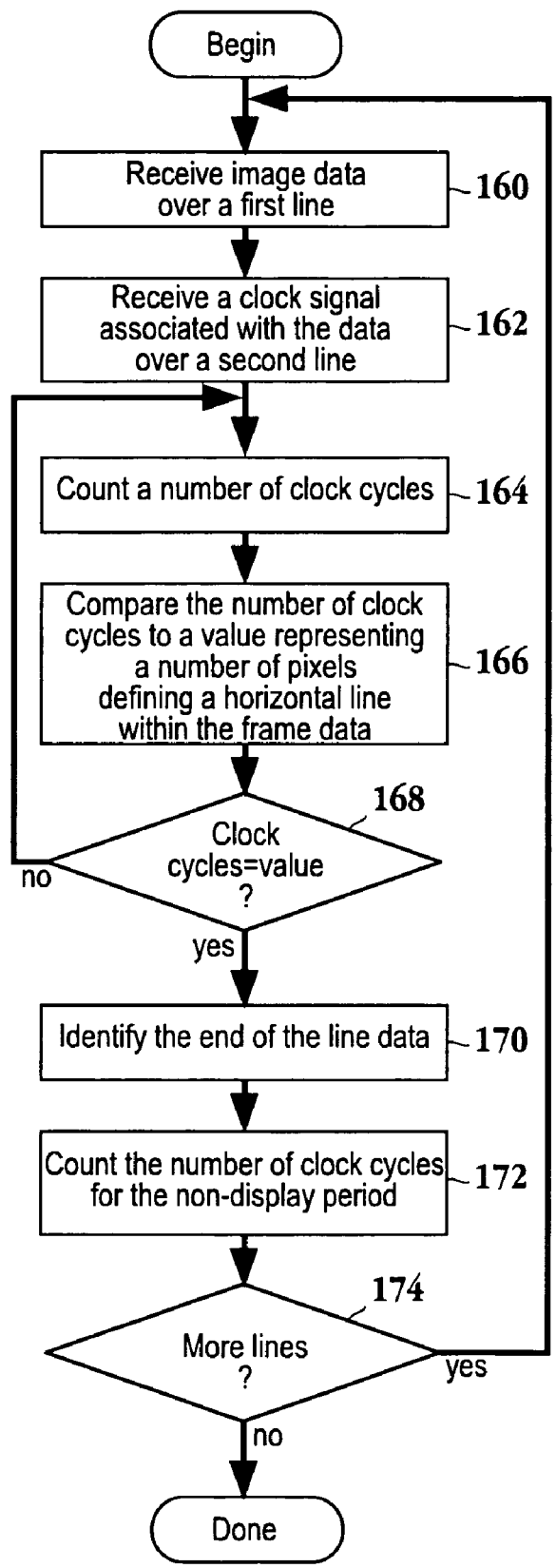
FIG. 5 is a flow chart diagram indicating the method operations for signaling a start and end of line data for a serial interface having a maximum of two signal lines in accordance with one embodiment of the invention.

FIG. 5 is a flow chart diagram indicating the method operations for signaling a start and end of line data for a serial interface having a maximum of two signal lines in accordance with one embodiment of the invention. The method initiates with operation 160 where image data is received over a first line. The method then moves to operation 162 where clock signal associated with the data is received over a second line. With reference to FIGS. 1 and 2 the clock signal and the image data represent the data received over the first and second signal lines. It should be appreciated that method operation 160 and 162 occur contemporaneously. The method then advances to operation 164 where a number of clock cycles is counted as the data is being received. Here, the counter/comparator logic of FIG. 2 performs this function. Then, in operation 166 the number of clock cycles counted at each point is compared to a value representing a number of pixels defining a horizontal line within the frame data. For example, the number of clock cycles may be compared to the register value, which indicates the number of clock cycles for a horizontal display period. The counter/comparator logic of FIG. 2 may accomplish this function. The method then proceeds to decision operation 168 where it is determined if the clock cycles equals the value in the register. If the number of clock cycles does not equal the value in the register, the method returns to operation 164 where counting the number of clock cycles continues. If the number of clock cycles equals the value in the register, then the method proceeds to operation 170 where the end of the line data is identified or detected. That is, the end of the horizontal display period is identified as represented in FIG. 4.

The method then advances to operation 172 where the number of clock cycles for the non-display period is counted. As discussed above with reference to FIG. 4, the counter may be re-set once the end of the line data is identified in operation 170. The number of clock cycles counted is compared to the register value for the horizontal non-display period and when the number of clock cycles matches the value representing the non-display period the method advances to decision operation 174. It should be appreciated that when the number of clock cycles matches the non-display period value, a new line may begin. Thus, a signal replacing the horizontal synchronization signal may be generated in response to the number of clock cycles matching the non-display period value. In decision operation 174 it is determined if there are more lines to be counted. If there are more lines to be counted, the method returns to operation 160 and repeats as described above. If there are no more lines to be counted the method terminates.

Figure 6:
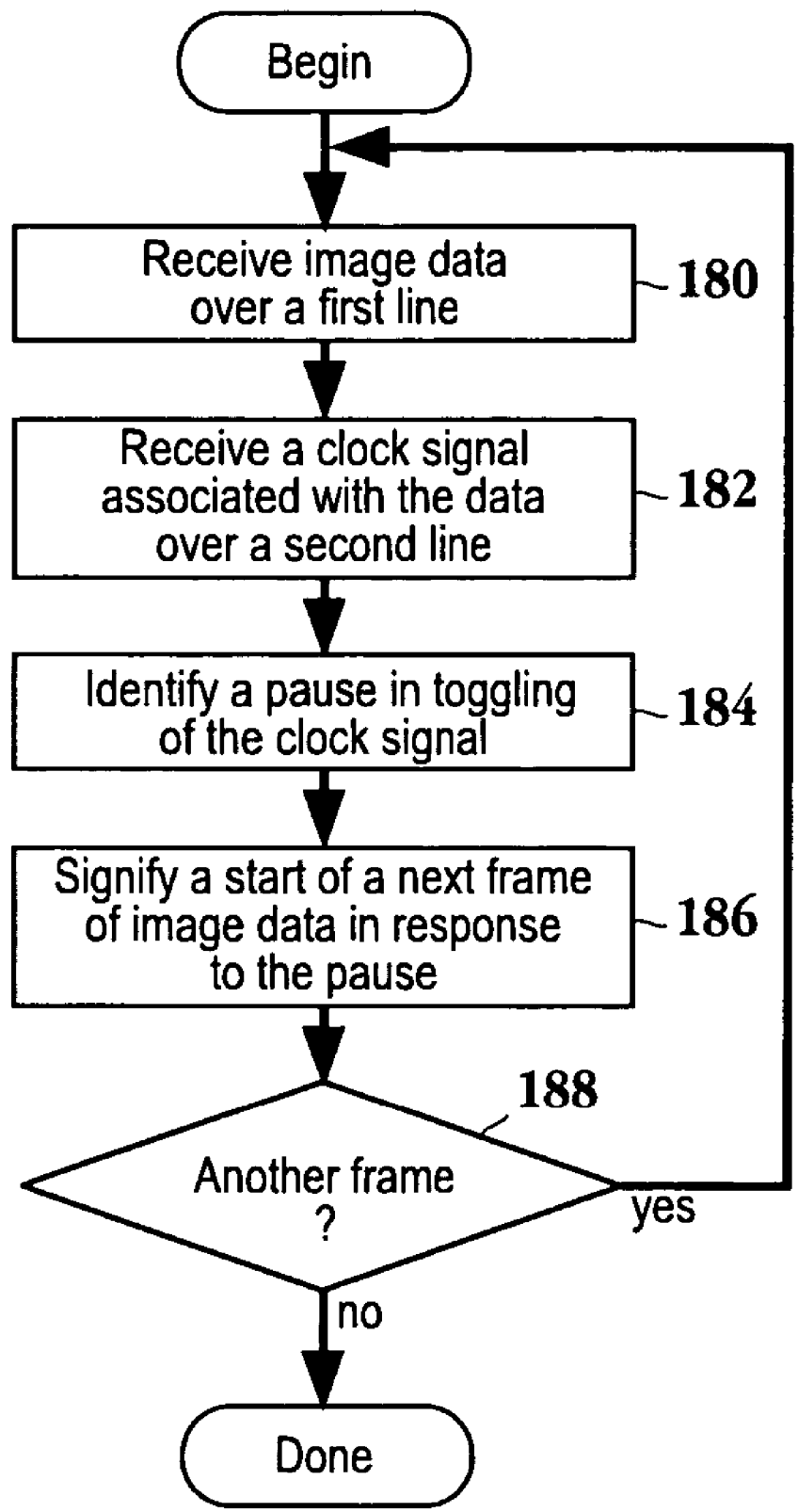
FIG. 6 is a flow chart diagram illustrating the method operations for signaling a start and end of frame data for a serial interface having a maximum of two signal lines in accordance with one embodiment of the invention.

FIG. 6 is a flow chart diagram illustrating the method operations for signaling a start and end of frame data for a serial interface having a maximum of two signal lines in accordance with one embodiment of the invention. The method initiates with operation 180 where image data is received over a first line. The method then advances to operation 182 where a clock signal associated with the data is received over a second line. It should be appreciated that operation 180 and 182, similar to operations 160 and 162 of FIG. 5 occur in parallel. Returning to FIG. 6, the method advances to operation 184, where a pause or interruption in the toggling of the clock signal is identified. As mentioned above with reference to FIG. 2, clock pause recognition logic may be used to recognize when the clock signal stops or pauses, i.e., is at a steady state. It should be appreciated that detecting the stopping of the clock for the end of frame detection is started once the end of the horizontal non-display has been reached, as referred to in operation 172 of FIG. 4. If toggling of the clock signal has been detected to stop, then everything is reset to the beginning of the image and the clock pause recognition logic awaits a clock signal to start again. It should be appreciated that if toggling of the clock continues, the next line of data will be received as discussed with reference to FIG. 5, and not the next frame. In operation 186 the start of a next frame of image data is signified in response to the pause in the clock signal. Thus, a signal replacing the vertical synchronization signal may be generated in response to the clock signal toggling interruption. The method then moves to operation 188 where it is determined that another frame of data is to be received. If another frame of data is to be received the method returns to operation 180 and repeats as described above. If another frame is not to be received, the method terminates.

In an alternative embodiment to the registers being used to indicate the non-horizontal non-display period and horizontal display period, a reserve value may be substituted. That is, a reserve value such as zero may be used to signify that a new line of data is being sent to the graphics engine. In one embodiment, the zero value would be the low value of the data range for each data format. For example, YUV422 data format is defined as 8 bits for each of the Y, U, and V components, where the U and V components are only sent every other pixel. Since the data range is 8 bits for YUV422, the reserved value would be signaled by 00h. Reserving the zero data value has a negligible effect on the image quality, especially for YUV formats, which typically set the data range to 16-235 for the U and V components. It should be appreciated that camera modules have the ability to set the data range of each of its output components. In order to accomplish this functionality a camera sensor manufacturer would have to adopt to this convention. That is, any sensor would have to have the logic to know that a certain value is reserved and is transmitted to the mobile graphics engine when a new line begins.

In summary, the above-described invention provides a scheme for reducing the signals required for communication with a camera module and a graphics chip and/or a CPU of a portable electronic device. It should be appreciated that this reduction of signals reduces printed circuit board complexity and chip pin count. In turn the board layer count is reduced, which reduces cost and size. Reducing the amount of signals also reduces cross talk between signals that are routed very close to each other because of low printed circuit board real estate area, thereby increasing signal integrity. As described above, the horizontal synchronization and vertical synchronization signals are no longer transmitted as separate control signals. Instead, the above-described embodiments utilize logic within the graphics chip or CPU to monitor the clock signal in order to determine the beginning and end of a frame of image data and a line of image data within a frame.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A method for signaling a start and end of frame and line data for a serial interface having a maximum of two signal lines, comprising method operations of:
   receiving image data over a first line;
   receiving a clock signal associated with the data over a second line;
   while receiving the image data, the method includes,
   counting a number of clock cycles;
   comparing the number of clock cycles to a value representing a number of pixels defining a horizontal line within the frame data;
   continuing the counting and the comparing until the number of clock cycles matches the value;
   when the number of clock cycles matches the value, the method includes,
   identifying the end of the line data;
   resetting a count representing the number of clock cycles;
   counting the number of clock cycles;
   comparing the number of clock cycles to a value representing a non-display period between horizontal lines within the frame data; and
   when the number of clock cycles matches the value representing the non-display period, the method includes,
   repeating the above method operations for successive line data.

2. The method of claim 1, further comprising:
   identifying a pause in toggling of the clock signal; and
   signifying the end of the frame of image data in response to the pause.

3. The method of claim 1 further comprising:
   detecting a resumption in toggling of the clock signal after a break in the toggling of the clock cycle; and
   signaling a start of a next frame of image data in response to the resumption.

4. The method of claim 1, wherein the method operation of comparing the number of clock cycles to a value representing a number of pixels defining a horizontal line within the frame data includes,
   accessing a register storing the value.

5. The method of claim 1, wherein the image data received over the first line is in a serial format.

6. A method for reducing a number of signals utilized for an interface receiving image data, comprising method operations of:
   receiving image data in a serial format over a first signal line;
   receiving a clock signal over a second signal line; and
   monitoring the clock signal to identify both transitions between frames of the image data and transitions between horizontal lines within a frame of the image data; and wherein
   the method operation of monitoring the clock signal to identify both transitions between frames of the image data and transitions between horizontal lines within a frame of the image data includes,
   detecting a break in the clock signal;
   issuing an end of frame signal in response to the break;
   detecting a resumption of the clock signal; and
   issuing a beginning of frame signal in response to the resumption.

7. The method of claim 6, wherein the method operation of monitoring the clock signal to identify both transitions between frames of the image data and transitions between horizontal lines within a frame of the image data includes,
   counting a number of clock cycles;
   comparing the number of clock cycles to a value representing a number of pixels defining a horizontal line within the frame data; and
   if the number of clock cycles is equal to the value, then the method includes,
   identifying an end of a horizontal line within the frame of image data.

8. The method of claim 7, wherein subsequent to the method operation of identifying an end of a horizontal line within the frame of image data, the method includes,
   counting the number of clock cycles;
   comparing the number of clock cycles to a value representing a non-display period between horizontal lines within the frame data; and
   if the number of clock cycles is equal to the value, then the method includes,
   identifying a beginning of a next horizontal line within the frame of image data.

9. A graphics controller comprising:
   an interface that receives image data in a serial format over a first signal line, and receives a clock signal over a second signal line; and
   clock pause recognition logic that monitors the clock signal to identify both transitions between frames of the image data and transitions between horizontal lines within a frame of the image data; the clock pause recognition logic:
   detecting a break in the clock signal;
   issuing an end of frame signal in response to the break;
   detecting a resumption of the clock signal; and
   issuing a beginning of frame signal in response to the resumption.

* * * * *